United States Patent
Ji (10) Patent No.: US 7,567,526 B2
(45) Date of Patent: Jul. 28, 2009

(54) SYSTEM AND METHOD FOR ASYNCHRONOUS WIRELESS COLLISION DETECTION WITH ACKNOWLEDGEMENT FOR AD HOC WIRELESS NETWORKS

(75) Inventor: Baowei Ji, Richardson, TX (US)

(73) Assignee: Samsung Electronics Co., Ltd., Suwon-si (KR)

(*) Notice: Subject to any disclaimer, the term of this patent is extended or adjusted under 35 U.S.C. 154(b) by 543 days.

(21) Appl. No.: 11/283,146

(22) Filed: Nov. 18, 2005

(65) Prior Publication Data

US 2006/0171408 A1 Aug. 3, 2006

Related U.S. Application Data

(60) Provisional application No. 60/647,897, filed on Jan. 28, 2005.

(51) Int. Cl.
*H04B 7/00* (2006.01)

(52) U.S. Cl. .................. 370/310.2; 370/477; 370/445; 370/459; 370/312

(58) Field of Classification Search .............. 370/310.2, 370/477, 445, 459, 312
See application file for complete search history.

(56) References Cited

U.S. PATENT DOCUMENTS

| | | | | |
|---|---|---|---|---|
| 4,755,990 | A * | 7/1988 | Bohler et al. ................ | 370/438 |
| 5,022,046 | A * | 6/1991 | Morrow, Jr. .................. | 375/130 |
| 5,231,634 | A * | 7/1993 | Giles et al. .................. | 370/348 |
| 5,394,391 | A * | 2/1995 | Chen et al. ................... | 370/441 |
| 5,418,785 | A * | 5/1995 | Olshansky et al. .......... | 370/438 |
| 5,438,683 | A * | 8/1995 | Durtler et al. ................ | 455/74 |
| 5,502,724 | A * | 3/1996 | Chen et al. ................... | 370/445 |
| 5,592,483 | A * | 1/1997 | Hieda et al. ................. | 370/445 |
| 5,608,729 | A * | 3/1997 | Orsic .......................... | 370/445 |
| 5,648,961 | A * | 7/1997 | Ebihara ....................... | 370/282 |
| 5,661,727 | A * | 8/1997 | Kermani et al. .............. | 370/445 |
| 6,320,870 | B1 * | 11/2001 | Thaler ......................... | 370/445 |
| 6,556,582 | B1 * | 4/2003 | Redi ........................... | 370/443 |
| 6,625,162 | B2 * | 9/2003 | Myojo et al. ................. | 370/445 |
| 7,061,877 | B1 * | 6/2006 | Gummalla et al. ........... | 370/278 |
| 2002/0080768 | A1 * | 6/2002 | Garcia-Luna-Aceves et al. . | 370/349 |

OTHER PUBLICATIONS

Fouad A. Tobagi, Packet Switching in Radio Channel: Part II—The Hidden Terminal Problem in Carrier Sense Multiple-Access and the Busy-Tone Solution, Dec. 1975, IEEE Transactions on Communications, vol. com-23, No. 12, pp. 1424-1431.*

(Continued)

*Primary Examiner*—Charles N Appiah
*Assistant Examiner*—Kwasi Karikari (57) ABSTRACT

The present disclosure relates generally to a system and method for asynchronous busy-tone multiple access with acknowledgement for ad hoc wireless networks. In one example, the method includes emitting a tone after determining that a transmission is incoming from a sending node. An initial portion of a packet comprising the transmission is received while emitting the tone, where the initial portion contains a destination address of the packet. The emitting of the tone is stopped if the received destination address does not match an address of the receiving node. A remaining portion of the packet is received while continuing to emit the tone if the received destination address matches the address of the receiving node.

22 Claims, 6 Drawing Sheets

OTHER PUBLICATIONS

Ajay Chandra V. Gummalla and John O. Limb; Wireless Collision Detect (WCD): Multiple Access with Receiver Initiated Feedback and Carrier Detect Signal; Georgia Institute of Technology, Atlanta, GA; pp. 397-401; 2000, IEEE.

Zygmunt J. Haas and Jing Deng; Dual Busy Tone Multiple Access (DBTMA)—A Multiple Access Control Scheme for Ad Hoc Networks; IEEE Transactions on Communications, vol. 50, No. 6, Jun. 2002; pp. 975-985.

Fouad A. Tobagi and Leonard Kleinrock; Packet Switching in Radio Channels: Part II—The Hidden Terminal Problem in Carrier Sense Multiple-Access and the Busy-Tone Solution; IEEE Transactions on Communications, vol. Com-23, No. 12, Dec. 1975; pp. 1417-1433.

Cheng-Shong Wu and Victor O.K. Li; Receiver-Initiated Busy-Tone Multiple Access in Packet Radio Networks; University of Southern California, Los Angeles; 1988 ACM; pp. 336-342.

* cited by examiner

SYSTEM AND METHOD FOR ASYNCHRONOUS WIRELESS COLLISION DETECTION WITH ACKNOWLEDGEMENT FOR AD HOC WIRELESS NETWORKS

CROSS-REFERENCE

This application claims priority from U.S. Provisional Application Ser. No. 60/647,897, filed on Jan. 28, 2005, which is incorporated herein by reference.

This application is related to U.S. patent application Ser. No. 11/282,183, filed on Nov. 18, 2005, and entitled "SYSTEM AND METHOD FOR ASYNCHRONOUS BUSY-TONE MULTIPLE ACCESS WITH ACKNOWLEDGEMENT FOR AD HOC WIRELESS NETWORKS," which claims priority from U.S. Provisional Application Ser. No. 60/643,721, filed on Jan. 13, 2005.

BACKGROUND

An ad hoc wireless network is a collection of devices (e.g., nodes) capable of wirelessly communicating and networking. Generally, ad hoc wireless networks operate in a distributed, not-fully-connected, asynchronous, and mobile manner. Examples of ad hoc networks include wireless sensor networks, packet radio networks, and wireless mesh networks. An ideal ad hoc network provides multi-hop transmission, high mobility, self-organization, seamless handover, quality of service (QoS), and high spectrum efficiency.

In general, nodes in an ad hoc network are distributed and an ad hoc network has no central controllers, such as access points (AP) in a wide local area network (WLAN) environment or base stations (BS) as described with respect to IEEE 802.16. Therefore, nodes within an ad hoc network cannot rely on a central control architecture to synchronize communications and prevent collisions. Furthermore, an ad hoc network is not guaranteed for full connection (e.g., some nodes may not be able to hear each other), which results in hidden-node and exposed-node problems.

A hidden node is within the coverage of a receiving node, but is outside of the coverage of a sending node that is transmitting to the receiving node. If the hidden node is transmitting at the same time as the sending node is transmitting, the hidden node's transmission will cause interference with the receiving node and will prevent the receiving node from receiving a message from the sending node. An exposed node is a node that is within a sending node's coverage, but outside the receiving node's coverage. The exposed node will not be able to receive while the sending node is transmitting. However, the exposed node may transmit to another receiving node outside of the sending node's coverage without causing interference. For reasons such as these, the design of media access control (MAC) protocols for ad hoc networks is challenging.

SUMMARY

In one embodiment, a method for use by a receiving node in an ad hoc network is provided. The method includes emitting a tone after determining that a transmission is incoming from a sending node and receiving an initial portion of a packet comprising the transmission while emitting the tone, where the initial portion contains a destination address of the packet. The method also includes stopping the emitting of the tone if the received destination address does not match an address of the receiving node, and receiving a remaining portion of the packet while continuing to emit the tone if the received destination address matches the address of the receiving node.

In another embodiment, a method for use by a sending node in an ad hoc network is provided. The method includes attempting to detect a tone emitted by one of a plurality of receiving nodes. A timer of a first time period is set and an initial portion of a packet is sent to a receiving node if no tone is detected, where the initial portion contains a destination address of the receiving node. The method determines whether a tone is detected during the first time period, and sends a remaining portion of the packet to the receiving node if the tone is detected before the first period expires.

In still another embodiment, a method for use in an ad hoc network is provided. The method includes starting, by a first node, a first timer and initiating, by the first node, a transmission to a second node. The second node emits a tone in response to detecting the initiating of the transmission and determines whether the transmission is intended for the second node based on a first portion of a packet comprising the transmission received by the second node. The emission of the tone is continued if the packet is intended for the second node. The first node sends a second portion of the packet if the tone is still being emitted by the first node after the expiration of the first timer, and the second node stops the emitting of the tone after receiving the second portion of the packet.

In yet another embodiment, a receiving node for use within an ad hoc network is provided. The receiving node includes a wireless communication system, a processor coupled to the wireless communication system, and a memory containing a plurality of instructions for execution by the processor. The instructions include instructions for: receiving a plurality of bits from a sending node, where the plurality of bits comprise a portion of an address header for a data packet; turning on a tone after receiving the plurality of bits and before identifying the address header; comparing the address header with an address of the receiving node and continuing to emit the tone if the address header matches the address of the receiving node; and turning off the tone after receiving a remaining portion of the data packet.

In another embodiment, a sending node for use within an ad hoc network is provided. The sending node includes a wireless communication system, a processor coupled to the wireless communication system, and a memory containing a plurality of instructions for execution by the processor. The instructions include instructions for: setting a timer of a first time period and initiating a transmission of a data packet to a receiving node if a tone is not detected; determining if a tone is detected prior to the expiration of the timer; and continuing the transmission of the data packet if a tone is detected, where the entire transmission is substantially uninterrupted if a tone is detected.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1b is a block diagram of one embodiment of a node within the ad hoc wireless network of FIG. 1a.

FIG. 4 is a diagram of one embodiment of a timing sequence that describes the timing of events between a sending node and receiving node in the network of FIG. 1a.

FIG. 5 is a diagram of another embodiment of a timing sequence that describes the timing of events between a sending node and receiving node in the network of FIG. 1a.

FIGS. 7a-7d illustrate four scenarios that may occur within the network of FIG. 1a.

DETAILED DESCRIPTION

It is to be understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

For purposes of convenience, the following notations will be used throughout the remainder of this disclosure.

$\Gamma$ maximum one-way propagation delay
$\tau$ one-way propagation delay, $0<\tau\leq\Gamma$
$\delta$ data transmission duration
$\delta_{AH}$ length of data transmission duration
$\Delta_1$ address header (AH) acknowledgement duration
$\Delta_2$ data acknowledgement duration
$\gamma$ length of RTS packet (used in previous protocols)

Figure 1A:
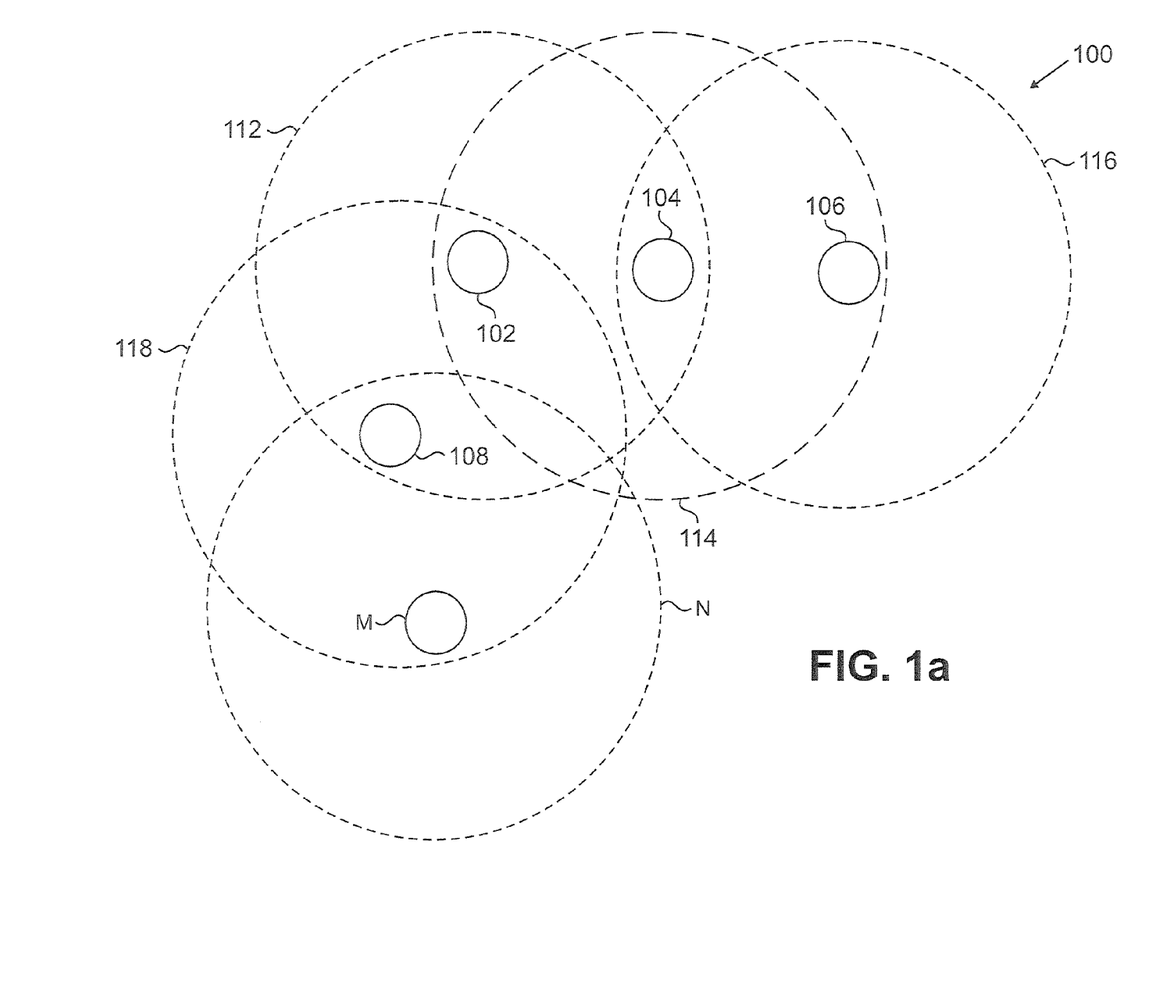
FIG. 1a is a diagram of one embodiment of an ad hoc wireless network.

Referring to FIG. 1a, in one embodiment, an ad hoc wireless network 100 is configured with multiple nodes 102, 104, 106, 108, . . . , M. Each node 102-M has an associated coverage area 112, 114, 116, 118, . . . , N, respectively, within which each node may send information to other nodes within the network 100. It is understood that the coverage areas for a particular node 102-M may not be equal and that the shape of a coverage area may not correspond to a circle as shown. Furthermore, different nodes may have different coverage areas, and a coverage area for a single node may vary depending on the environment, available power, and other factors. The ad hoc network 100 may be any type of ad hoc network, including wireless sensor networks, packet radio networks, and wireless mesh networks.

Figure 1B:
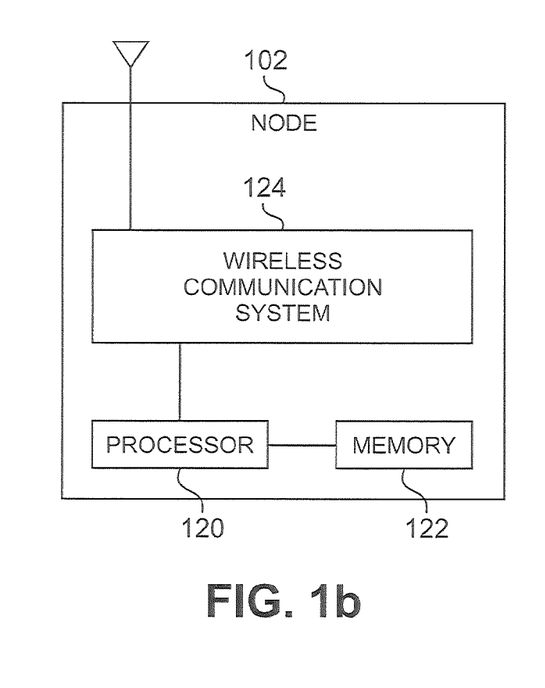

With additional reference to FIG. 1b, one embodiment of the node 102 of FIG. 1a is illustrated. A processor 120 is coupled to a memory 122 and a wireless communications system 124. The memory 122 contains instructions for execution by the processor 120 for sending and receiving wireless communications via the wireless communications system 124. Although not shown, it is understood that the node 102 may include other components, such as a microphone, speaker, and keys for manual data entry and for controlling the node 102. Each node 102-M may be any type of wireless device capable of using the network 100 of FIG. 1a. Examples of such devices include laptop computers, personal digital assistants (PDAs), and cellular phones.

Figure 7A:
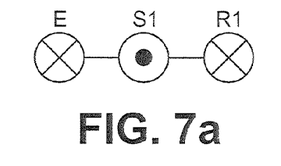
Figure 7B:
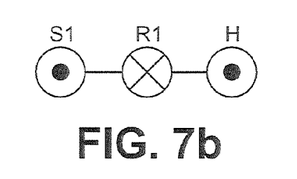

Referring again specifically to FIG. 1a, as an illustration of the previously described hidden-node problem, assume that the node 102 is a sending node and the node 104 is a receiving node. Because the node 106 is within the coverage area of the node 104 but the node 106 is not within the coverage area of the node 102, the node 106 is hidden from the node 102. Therefore, both the node 102 and the node 106 may try to transmit to the node 104. The two transmissions may create interference that will prevent the node 106 from successfully receiving either transmission, as illustrated in FIG. 7b.

As an illustration of the previously described exposed-node problem, assume that the node 102 is a sending node and the node 104 is a receiving node. Because the node 108 is within the coverage area of the node 102, the node 108 is an exposed node that may not be allowed to transmit while the node 102 is transmitting, as illustrated in FIG. 7a. However, because the node 104 is not within the coverage area 118 of the node 108, a transmission by the node 108 would not affect the reception of the node 104. Therefore, the node 108 should be allowed to transmit to other nodes (e.g., to the node M), despite its proximity to the node 102.

Some previous attempts for solving hidden/exposed-node problems have relied on an RTS-CTS (Clear To Send) mechanism. In one approach using this mechanism, before a sending node $S_1$ sends data to a receiving node $R_1$, $S_1$ first sends out an RTS packet to which $R_1$ should respond with a CTS packet. All nodes that hear the RTS defer long enough for $S_1$ to receive the CTS packet. All nodes that hear the CTS defer long enough for $R_1$ to finish receiving the data that follows. After a successful RTS-CTS handshake, $S_1$ can start sending data to $R_1$. However, in this mechanism, exposed nodes cannot complete the RTS-CTS handshake cycle and concurrent transmission is inhibited. While an exposed node is allowed to send an RTS, it cannot receive a CTS due to the interference from $S_1$'s transmission. Another approach suggests a possible solution by explicitly terminating the transmission attempt of exposed nodes by using RTS-CTS-DS (Data Sending) handshaking, together with other protocol enhancements. However, neither approach solves the hidden-node problem because of possible CTS collisions.

In a CTS collision, while $R_1$ is sending a CTS to $S_1$, a hidden node H may be sending out some packets. In this case, H does not hear $R_1$'s CTS, and the nodes within the coverage of both $R_1$ and H may not be able to detect the transmissions from $R_1$ and H. However, these nodes may not defer their transmissions and may destroy the receiving ability of $R_1$. One possible solution uses CTS's dominance over RTS to resolve this CTS collision problem. More specifically, a CTS packet is required to be long enough that the hidden node H will hear at least part of the CTS packet even after it sends out a whole RTS packet. H either receives the CTS and does not transmit, or detects the noise due to the remainder of the CTS packet and stops transmitting. However, a problem with this CTS-dominance approach is that a node cannot tell the difference between an RTS collision and a CTS collision. Whenever a collision is detected, the involved node backs off. This may result in long backoff periods that substantially limit the total network throughput.

One possible solution to the hidden node problem requires a receiver to power up a busy tone (BT) to warn hidden nodes of its receiving activity. For example, the busy tone can be an unmodulated sine wave out of the data channel, although the busy tone does not have to occupy significant spectrum compared with the spectrum of data channel. However, this busy tone multiple access (BTMA) solution was designed for centralized networks where a centralized controller, such as an access point, controls the busy tone. BTMA may be extended for packet radio networks by having all the nodes within the sender's coverage turn on a busy tone, which solves the hidden-node problem. However the cost of BTMA is high, as no concurrent transmissions are allowed within the double radius of the sender. Moreover, the exposed-node problem may be intensified.

A possible alteration of the BTMA approach, called receiver-initiated BTMA (RI-BTMA), is to have only the targeted receiver turn on the busy tone. Then, if $S_1$ does not sense a busy tone, $S_1$ will first transmit a preamble containing $R_1$'s address and will not begin transmitting data until it hears a busy tone. Having received the preamble and recognizing its own address in the preamble, $R_1$ then powers up the busy tone and is ready to receive data. However, the RI-BTMA approach does not eliminate hidden nodes.

To address hidden nodes, a wireless collision detection (WCD) approach may be implemented using two busy tones. Upon detecting transmission activity, all receivers power up a carrier detect (CD) tone and continue receiving the header part of the data packet. After receiving the data header, only the targeted receiver whose address matches the address in the header will switch from the CD tone to a feedback tone (FT). All other receivers eventually turn off their CD tone. The sender will abort the data transmission if the FT tone is not sensed after a certain number of time slots. The CD tone provides an immediate warning to hidden nodes of the ongoing data transmission, but at the cost of unnecessary warnings to other nodes within the double radius of the sender.

Both RI-BTMA and WCD are based on slotted operation mode. However, synchronization is generally difficult to achieve in wireless ad hoc networks. Another approach, called dual busy tone multiple access (DBTMA), is to use two physically separate tones, one for transmitting (BTt) to warn all nodes within the sender's coverage of the transmission, and the other for receiving (BTr) to warn all nodes within the receiver's coverage. In DBTMA, when $S_1$ is ready to transmit data to $R_1$, it determines whether either BTt or BTr are on. If neither tone is on, $S_1$ sends out an RTS packet and waits for $R_1$ to turn on BTr as an acknowledgement of correctly receiving the RTS. When $S_1$ hears BTr, it waits for $2\Gamma$ to allow BTr to reach all nodes within the coverage of $R_1$ and shut down any competing RTS packets (if any) sent by hidden nodes. $S_1$ then sends out the data packet. While DBTMA provides a data transmission that is free of collisions via the two busy tones, it may waste resources due to RTS collisions. More specifically, the time during which an RTS packet is being received is vulnerable because the targeted receiver will not turn on BTr until it successfully receives the entire RTS packet and the transmitting tone BTt has no affect on hidden nodes. Accordingly, system throughput is likely limited by RTS collisions due to competing transmissions from hidden nodes and BTt unnecessarily inhibits exposed nodes for up to the duration of the RTS packet.

Figure 2:
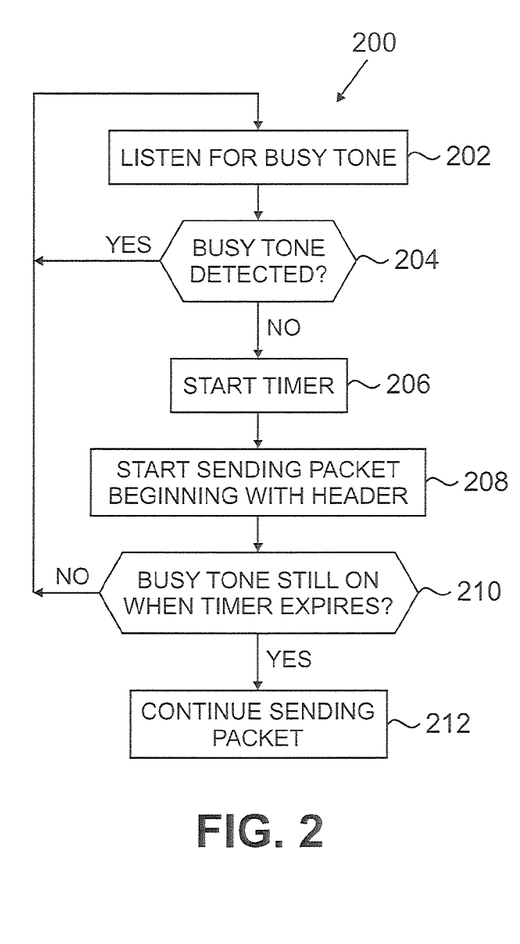
FIG. 2 is a flowchart of one embodiment of a method by which a sending node within the network of FIG. 1a can interact with a receiving node.

Referring to FIG. 2, in one embodiment, a method 200 illustrates how a sending node (e.g., the node 102 of FIG. 1) can determine whether to send data to a receiving node (e.g., the node 104 of FIG. 1). As will be described later in greater detail, the node 102 performs certain actions based on whether the node 104 is emitting a tone. Although a busy tone is used for purposes of example throughout this disclosure, it is understood that other types of tones may be used to implement the present invention, and that the term "busy tone" is representative of other tones. The node 102 need not emit any tone and relies on the busy tone emitted by the node 104 to deal with the previously described exposed-node and hidden-node problems.

In step 202, the node 102 listens for a busy tone. If it detects a busy tone, as determined in step 204, it returns to step 202. This loop may repeat until the node 102 does not detect a busy tone or the request to send data is canceled. If no busy tone is detected, the node 102 turns on a timer having a predefined duration in step 206 and starts sending a data packet in step 208, beginning with the packet's header. The header contains the address of the receiving node.

It is understood that "predefined" may encompass both static and dynamically calculated time periods. For example, a static time period may be predefined because a particular time duration is set, while a dynamic time period may be predefined because it is calculated using a predefined process, relationship, or set of parameters. In the present example, the predefined duration is sufficient for the header to reach the receiving node 104 and for the busy tone to return to the node 102.

In step 210, the node 102 determines whether the node 104 has acknowledged receiving the header by determining whether the busy tone is still on when the timer expires. If the header is not acknowledged, the method returns to step 202. If the header is acknowledged, the method continues to step 212, where the node 102 continues sending the packet to the node 104. It is understood that there may be no pause between sending the header and sending the remaining portion of the packet. For example, the timer may not expire until the node 102 is already sending the remaining portion of the packet. Although not shown in FIG. 2, it is understood that the node 102 may also wait for an acknowledgement that the transmitted data has been received by the node 104.

Figure 3:
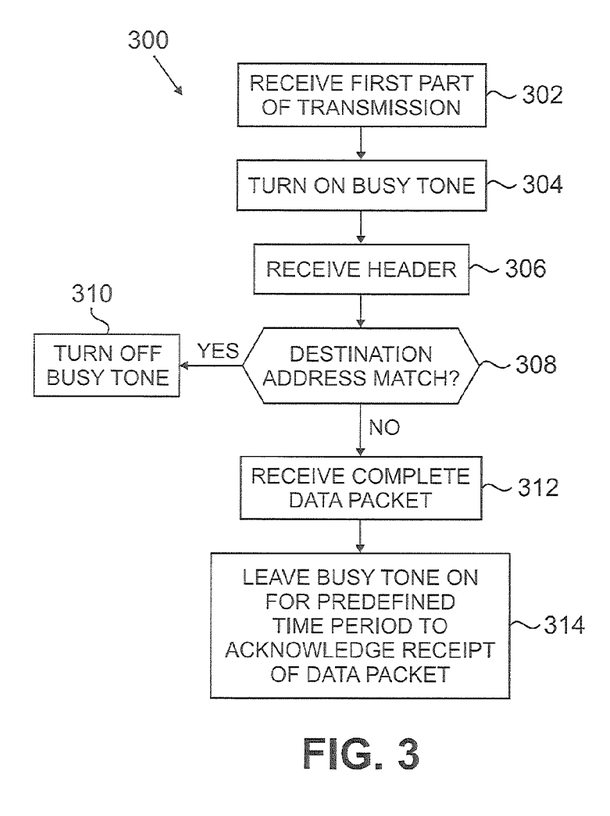
FIG. 3 is a flowchart of one embodiment of a method by which a receiving node within the network of FIG. 1a can interact with a sending node.

Referring to FIG. 3, in another embodiment, a method 300 illustrates how a receiving node (e.g., the node 104 of FIG. 1) can receive data from a sending node (e.g., the node 102 of FIG. 1) while preventing interference from other nodes. As will be described later in greater detail, the node 104 accomplishes this by emitting a busy tone. The node 102 need not emit any tone and relies on the busy tone emitted by the node 104 to deal with the previously described exposed-node and hidden-node problems.

In step 302, the node 104 begins to receive the first part of a transmission (e.g., one or more incoming bits), and turns on a busy tone in step 304. In step 306, the node 104 receives a data packet header that contains a destination address of the data packet. In step 308, the node 104 determines whether the destination address in the header matches the address of the node 104. If there is not an address match, the method 300 turns off the busy tone in step 310 and returns to an idle state to await another incoming transmission. If there is an address match, the node 104 leaves the busy signal on and receives the complete data packet in step 312. After receiving the entire data packet, the node 104 may leave the busy tone on for a predefined period of time to acknowledge the receipt of the data packet to the sending node 102.

Figure 4:
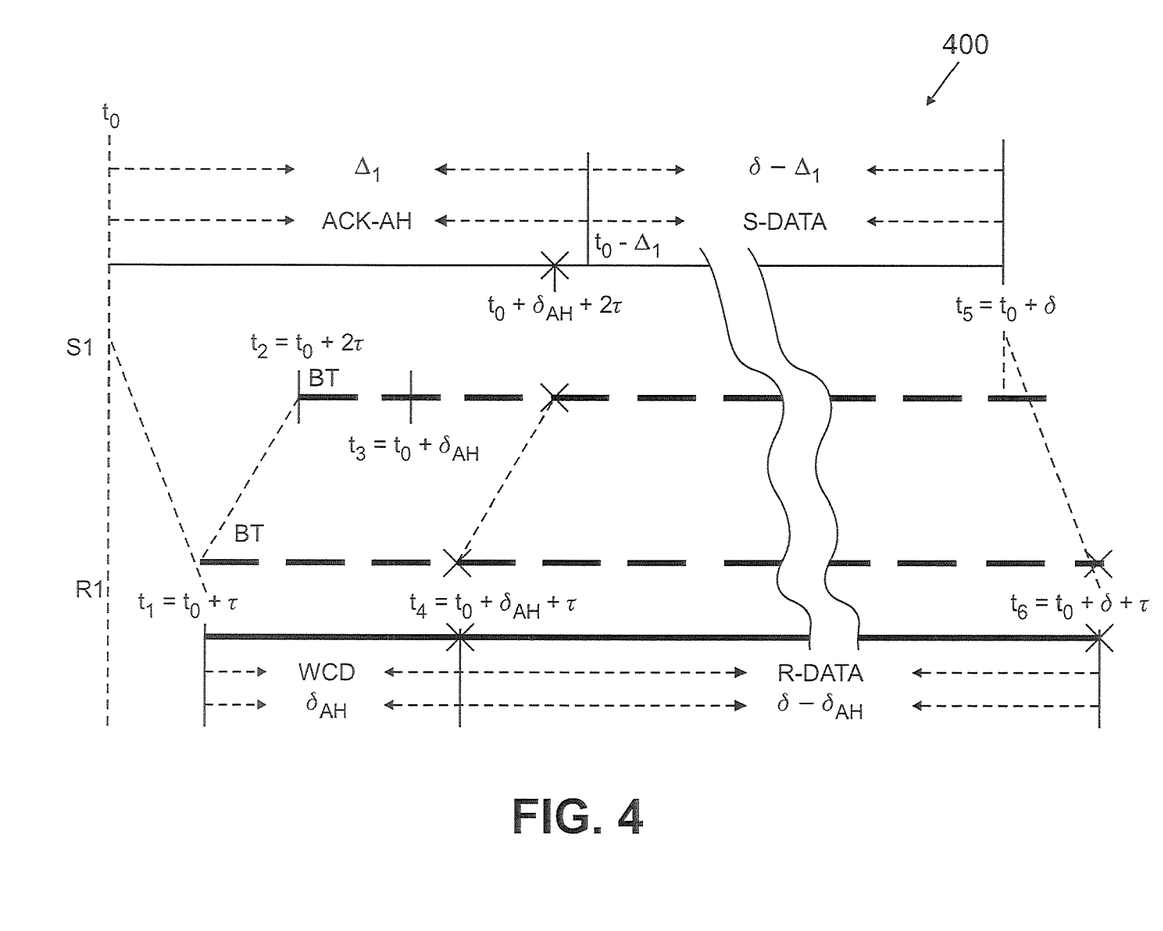

Referring to FIG. 4, in yet another embodiment, a timing diagram 400 illustrates the coordination of a sending node $S_1$ (e.g., the node 102 of FIG. 1) and a receiving node $R_1$ (e.g., the node 104 of FIG. 1) using an asynchronous wireless collision detection with acknowledgement (AWCD/ACK) process. For example, the diagram 400 may be used to coordinate the methods 200 and 300 of FIGS. 2 and 3, respectively. The diagram 400 includes two states in which the node 102 may operate (ACK-AH and S-DATA) and two states in which the node 104 may operate (WCD and R-DATA), each of which will be described in greater detail with respect to FIG. 6.

In the present example, the node 102 is attempting to send data to the node 104, which is $\tau$ seconds away ($0 < \tau \leq \Gamma$). For purposes of clarity, the data processing time, transmit/receive turnaround time, and busy tone detection time are ignored in the diagram 400.

At time $t_0$, the node 102 prepares to begin transmitting. However, before doing so, it determines whether a node is sending out a busy tone. If the node 102 does not detect a busy tone, it starts a timer having a duration of $\Delta_1$ seconds and begins transmitting the data packet beginning with the node 104's address.

At time $t_1=t_0+\tau$, the first bit of the data packet reaches the node 104, which turns on the busy tone.

At time $t_2=t_0+2\tau$, the node 102 detects the busy tone emitted by the node 104.

At time $t_3=t_0+\delta_{AH}$, the node 102 finishes transmitting the portion of the data packet containing the address header (AH). After transmitting the header, the node 102 continues sending the remainder of the data packet.

At time $t_4=t_3+\tau=t_0+\delta_{AH}+\tau$, the node 104 receives the address header recognizes the address as that of the node 104. After matching the addresses, the node 104 continues to emit the busy tone and continues receiving the rest of the data packet. If the addresses do not match, the node 104 will turn off the busy tone and wait for the next incoming transmission.

At time $t_5=t_0+\delta$, the node 102 finishes transmitting the entire data packet and ends a data transmission cycle.

At time $t_6=t_5+\tau=t_0+\delta+\tau$, the node 104 receives the entire data packet successfully and ends a data reception cycle.

Figure 5:
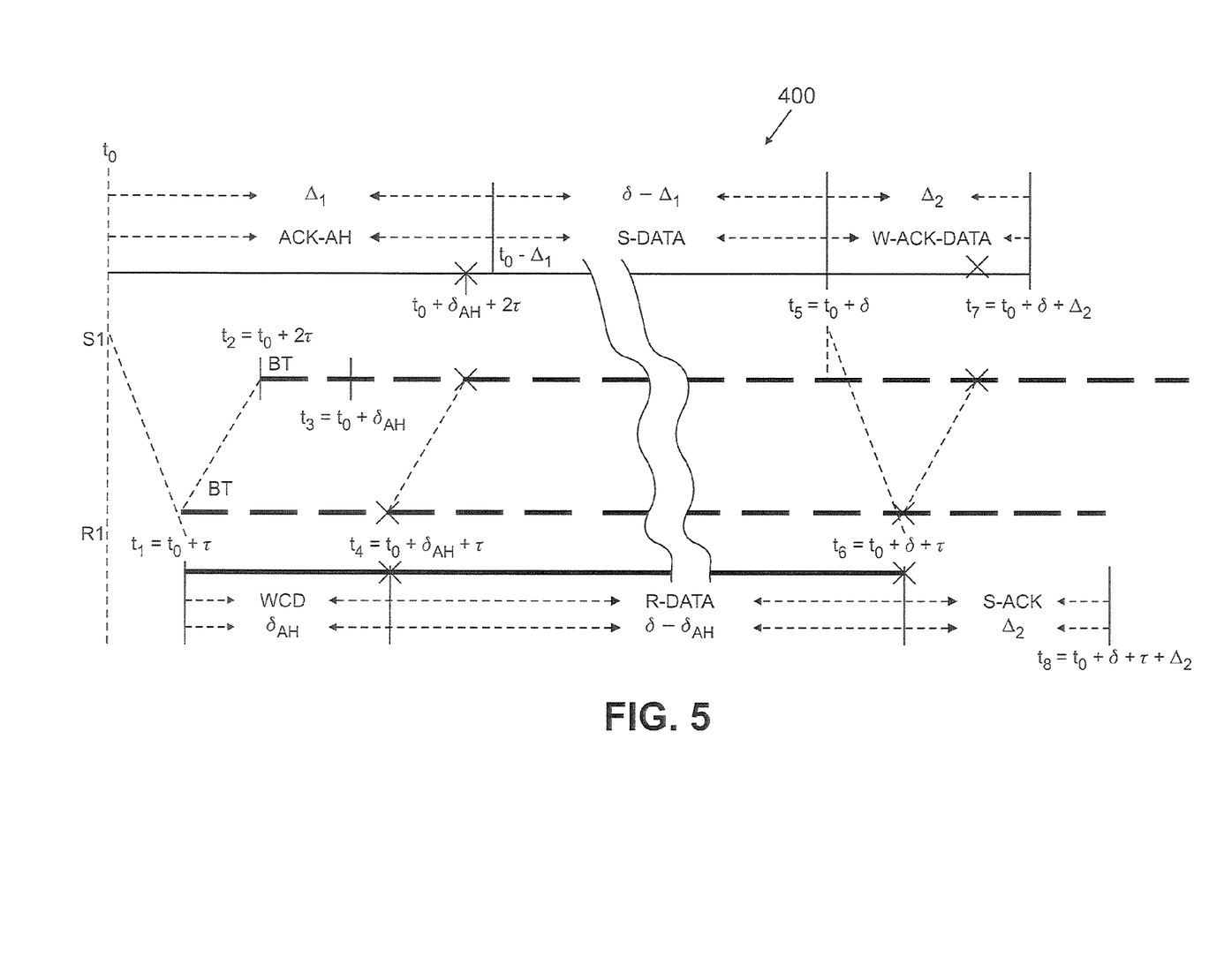

Referring to FIG. 5, a timing diagram 500 illustrates another embodiment of an operation using the AWCD/ACK protocol. The present example differs from the embodiment of FIG. 4 in that the receiving node 104 uses the busy tone to acknowledge receipt of the data. Because times $t_0$ through $t_4$ are similar to those described above with respect to FIG. 4, the present example begins at time $t_5$ after the node 102 has finished sending the packet.

At time $t_5=t_0+\delta$, instead of finishing its data transmission cycle, after transmitting the entire data packet, the node 102 starts a timer having a duration of $\Delta_2$ seconds. The node 102 may also send dummy data while the timer is running.

At time $t_6=t_5+\tau=t_0+\delta+\tau$, the node 104 receives the entire data packet successfully and, instead of ending its data reception cycle, starts a timer having a duration of $\Delta_2$ seconds.

At time $t_7=t_5+\Delta_2=t_0+\delta+\Delta_2$, the node 102 detects that the busy tone is still being emitted, which implies data transmission success, and finishes its data transmit cycle.

At time $t_8=t_6+\Delta_2=t_0+\delta+\tau+\Delta_2$, the node 104 turns off the busy tone and finishes its data receiving cycle. Accordingly, the busy tone can be used to acknowledge the receipt of the data, as well as the receipt of the header.

Figure 6:
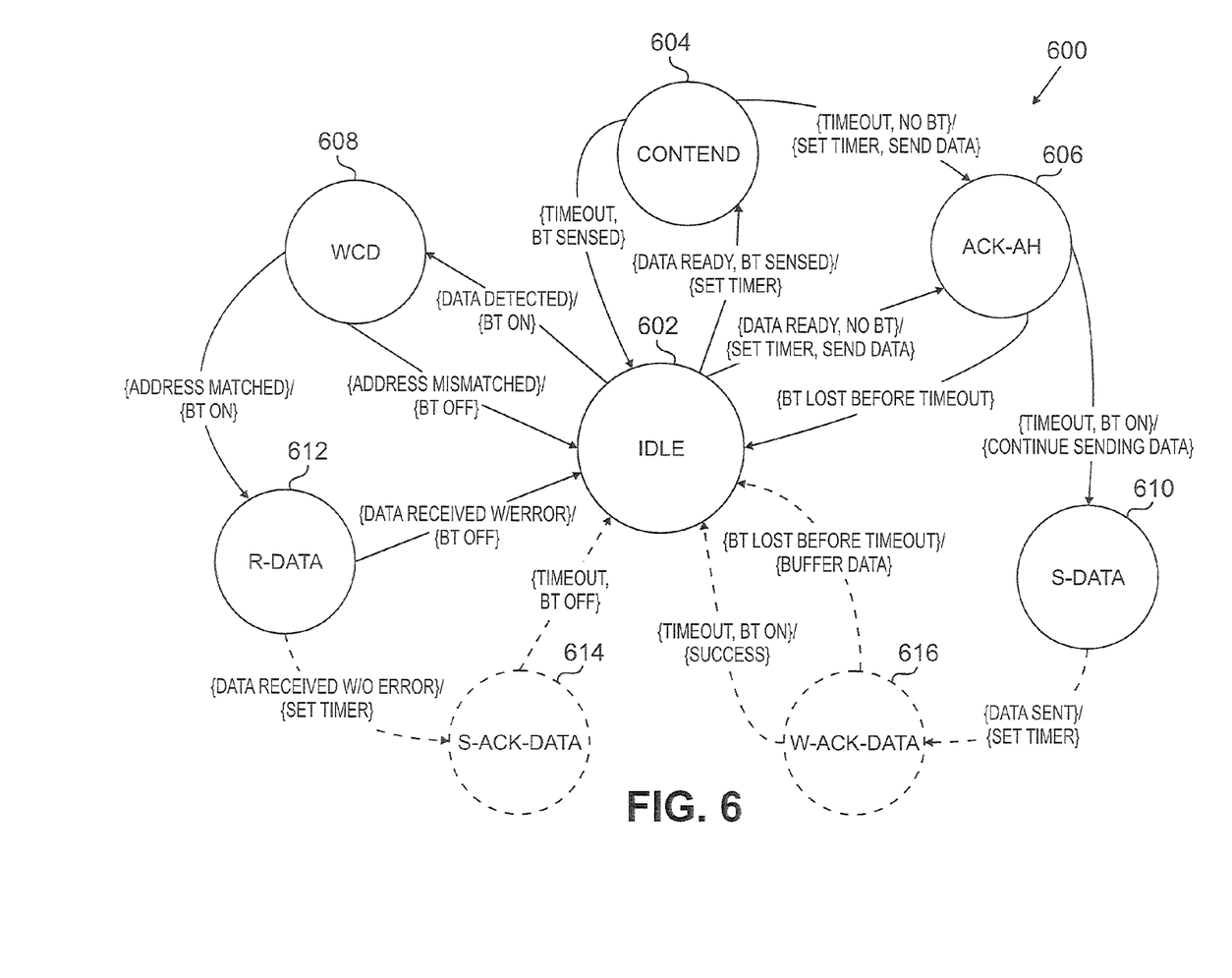
FIG. 6 is a diagram of one embodiment of a state machine that may be used to implement the timing sequence of FIG. 5.

Referring to FIG. 6, one embodiment of a finite state machine 600 is illustrated with states corresponding to the timing diagram 500 of FIG. 5. The state machine 600 of the present example includes eight states, with an IDLE state 602 at the center. A CONTEND state 604 is an intermediate state for a sending node between the IDLE state 602 and an ACK-AH state 606. The states 604, 606, 610, and 616 are sender-involved and the states 608, 612, and 614 are receiver-involved. The following description of the state machine 600 moves through the states in the order in which they may occur in a successful transmission/reception scenario.

The IDLE state 602 is entered after a node (e.g., the node 102 or node 104 of FIG. 1) is powered up. The node remains in the IDLE state 602 if it does not become involved in sending or receiving activities. The IDLE state 602 is the state to which most of the other states return if certain events happen, as will be described below in detail with respect to each state. In the present example, if a node in the IDLE state 602 has a data packet ready to send, the node is in data sending mode. Otherwise, the node is in receiving mode.

The CONTEND state 604 is an intermediary state. When a sending node (e.g., the node 102) has a data packet ready for transmission to a receiving node (e.g., the node 104), the node 102 first determines whether there is a busy tone being emitted. As previously described, if a busy tone is sensed, the node 102 will refrain from sending so as not to interrupt an existing transmission. Instead, the node 102 starts a timer according to a pre defined backoff process and enters the CONTEND state 604. When the timer expires, the node 102 again determines if a busy tone is being emitted. If it detects a busy tone again, the node 102 returns to the IDLE state 602 and starts the process again from there. If no busy tone is detected, the node 102 proceeds to the ACK-AH state 606.

The ACK-AH state 606 may be entered in two ways. In addition to entering the ACK-AH state 606 via the CONTEND state 604, as previously described, the sending node 102 may enter the ACK-AH state 606 directly from the IDLE state 602 if a busy tone is not sensed when the node 102 has data ready to send. In the ACK-AH state 606, the node 102 sets up a timer of duration $\Delta_1 > 2\Gamma$ and starts sending data beginning with the address header of the data packet. If the busy tone is still on when the timer expires, the node 102 enters the S-DATA state 610.

Upon detecting a new data transmission, a node in the receiving mode of the IDLE state (e.g., the node 104) turns on its busy tone and enters the wireless collision detection (WCD) state 608, where it begins to receive and decode the incoming address header. Having received the address header (which takes $\delta_{AH}$ seconds) and matched the header's address with its own address, the node 104 enters the R-DATA state 612. If the addresses do not match, the node 104 turns off its busy tone and returns to the IDLE state 602.

After receiving acknowledgement of the header's transmission to the node 104 in the ACK-AH state 606, the node 102 enters a data sending state S-DATA 610 and continues transmitting the remainder of the data packet. After finishing its transmission, the node 102 starts a timer of duration $\Delta_2 > 2\Gamma$ and enters the W-ACK-DATA state 616.

While in the R-DATA state 612, the node 104 continues to receive data until it has received the entire data packet from the node 102. After receiving the entire data packet, the node 104 enters the S-ACK-DATA state 614.

In the S-ACK-DATA state 614, the node 104 verifies the data packet. If there is an error, the node 104 powers off the busy tone and returns to the IDLE state 602. If the packet was received correctly, the node 104 continues sending the busy tone for $\Delta_2$ seconds to acknowledge receiving the data. It then powers off the busy tone and returns to the IDLE state 602.

The node 102 enters the waiting-for-acknowledgement-of-data state (W-ACK-DATA) 616 from the S-DATA state 610 after setting the timer having a duration of $\Delta_2$. The node 102 may continue sending data (e.g., dummy data) in order to prevent other nodes in its coverage area 112 from turning on a busy tone and destroying the acknowledgement process. The node 104 ignores the dummy data. While in the W-ACK-DATA state 616, the node 102 continues its detection of the busy tone. If there is no busy tone or the busy tone ends before the timer expires, the node 102 determines that the data packet did not reach the node 104 correctly (e.g., an error occurred). Accordingly, the node 102 buffers the data packet for retransmission in the future and returns to the IDLE state 602. If the node 102 continues to detect the busy tone until the timer expires, it determines that the data packet was received by the node 104 correctly and returns to the IDLE state 602.

It is understood that modifications may be made to the state machine 600 of FIG. 6. For example, with respect to FIG. 4, which does not include an acknowledgement of the data packet as described in FIG. 5,. the S-ACK-DATA state 614 may not leave the busy tone on for $\Delta_2$ seconds or may not be implemented at all (e.g., the node 104 may proceed from the R-DATA state 612 to the IDLE state 602 after successfully receiving the data). Similarly, from the sender's point of view, the W-ACK-DATA state 616 may not be implemented. Accordingly, various alterations may be made to the state machine 600 to enable it to perform in a desired manner.

The above embodiments illustrate that AWCD/ACK is designed to take into account various types of conflicts that may be present in ad hoc wireless networks. For example, the parameters of $\Delta_1$, $\Delta_2$, and $\delta_{AH}$ may be specified to resolve hidden/exposed-node problems and optimize spectrum efficiency.

The following paragraphs provide a series of proofs to detail a mathematical foundation for the various embodiments described above. It is understood that the following proofs are for purposes of example only, and are not intended to be limiting. For purposes of convenience, the following paragraphs use the terms "sender" and "$S_x$" for a sending node, and "receiver" and "$R_x$" for a receiving node. The following three equations illustrate a relationship between various parameters used above.

$$\delta_{AH} > 2\Gamma \quad \text{(Eq. 1)}$$

$$\Delta_1 > \delta_{AH} + 2\Gamma \quad \text{(Eq. 2)}$$

$$\Delta_2 > 2\Gamma \quad \text{(Eq. 3)}$$

Theorem 1: In AWCD/ACK, the sender who has sensed a busy tone at the end of the ACK-AH state (i.e., $\Delta_1$ seconds beginning from data transmit) is acknowledged of its transmission attempt uniquely by the targeted receiver.

Proof of Theorem 1: Suppose that node $S_1$ starts sending data to node $R_1$ at $t_0$. To be able to initiate data transmission, $S_1$ should not hear a busy tone at $t_0$. Assume there are competing receivers (e.g., $R_2$) in $S_1$'s coverage area trying to respond to a data transmission attempt by other senders.

$R_2$ cannot switch on a busy tone after the arrival of $S_1$'s data. The earliest time that $R_2$ can turn on the busy tone is $t_1=t_0-\tau$, where $\tau$ is the propagation delay between $R_2$ and $S_1$. $R_2$ cannot finish receiving the competing address header (AH) until $t_2=t_1+\delta_{AH}=t_0-\tau+\delta_{AH}$. On the other hand, the data from $S_1$ will reach $R_2$ no later than $t_3=t_0+\tau$. Given $\delta_{AH}>2\Gamma$ (Eq. 1), then $t_3<t_2$, which means $R_2$ cannot succeed in receiving the competing address header given the timely interference from $S_1$.

This illustrates that all other competing receivers have to give up their receiving attempts (i.e., they must turn off their busy tone at the end of receiving the competing AH). The latest time $R_2$ can detect a new incoming data transmission and initiate a competing busy tone is at $t_3$. Hence, the latest time $R_2$ must turn off its busy tone is $t_4=t_3+\delta_{AH}=t_0+\tau+\delta_{AH}$. All the competing busy tone signals except the one from $R_1$ will disappear at $S_1$ at $t_5=t_4+\tau=t_0+2\tau+\delta_{AH}$.

$S_1$ views the busy tone at $t_6=t_0+\Delta_1$ as the acknowledgement of its address header transmission. As long as $\Delta_1$ is larger than $2\Gamma+\delta_{AH}$ (Eq. 2), the following inequality exists:

$$t_5 < t_6 \quad \text{(Eq. 4)}$$

This illustrates that all other competing busy tone signals disappear at $S_1$ before the end of the ACK-AH state. Only the target receiver $R_1$ is acknowledging the data transmit.

Note that Theorem 1 illustrates that there is no ambiguity with respect to who should send data at the end of the ACK-AH state if there are competing data transmissions. In other words, neither RTS nor CTS are needed for the AWCD/ACK protocol. Theorem 1 also clarifies the requirements of Eqs. 1 and 2.

Theorem 1 validates the AWCD/ACK design from a sender's viewpoint. The following describes the AWCD/ACK design from a receiver's viewpoint.

Lemma 1: Assuming that packet collision is the only reason for a packet receiving error, a sender at the end of the S-DATA state who hears a busy tone has transmitted the data packet without collision in AWCD/ACK.

Proof of Lemma 1: Suppose that $R_1$ is receiving a data packet from $S_1$, while another node H who is $\tau$ seconds away from $R_1$ is trying to send a competing data packet (FIG. 7b). At time $t_1$, $R_1$ detects an incoming data transmission from $S_1$, and turns on a busy tone. $R_1$ must successfully receive the address header of $S_1$'s data in order for $S_1$ to enter and finish the S-DATA state. In other words, H should not be sending any competing data in the interval $[t_1-\tau, t_2]$, where $t_2=t_1+\delta_{AH}-\tau$. Otherwise, the competing data would reach $R_1$ at the interval $[t_1, t_1+\delta_{AH}]$, and destroy the reception activity at $R_1$, who would have turned off the busy tone at $t_1+\delta_{AH}$.

Define $$t_3 = \max\{t_2\} = t_1 + \delta_{AH} \quad \text{(Eq. 5)}$$

The above description illustrates that H cannot send data before $t_3$, and the following illustrates that H cannot send data after $t_3$. At time $t_4=t_1+\tau$, the busy tone reaches H, who will not be able to initiate a data transmission after $t_4$ until the busy tone disappears. Considering all the cases for node H, no node can initiate a competing data transmission after $t_5=\max\{t_4\}=t_1+\Gamma$ until the busy tone disappears.

Given the condition in Eq. 1, the following inequality exists:

$$t_5 < t_3 \quad \text{(Eq. 6)}$$

In conclusion, the success of $R_1$'s receipt of $S_1$'s address header implies that no competing data reaches $R_1$ while $R_1$ is receiving the address header and the data. This illustrates that a sender that has left the S-DATA state has sent its data without any collisions if a packet collision is the only reason for a receiving error.

Theorem 2: A sender that detects a busy tone at the end of the W-ACK-DATA state has transmitted the data packet without error in AWCD/ACK.

Proof of Theorem 2: Lemma 1 illustrates that there is no error in receiving due to data packet collisions as long as the receiver $R_1$ successfully receives the address header and keeps the busy tone on to sustain $S_1$'s data transmission. Theorem 2 illustrates that there is no receiving error due to other interferences if $S_1$ still senses the busy tone at the end of the W-ACK-DATA state.

If an error occurs during the receiving process, $R_1$ turns off the busy tone at $t_1=t_0+\delta+\tau$, where it is assumed that $S_1$ starts its data transmission at $t_0$ and the one-way propagation delay between $S_1$ and $R_1$ is $\tau$ seconds. The busy tone signal from $R_1$ will disappear at $t_2=t_0+\delta+2\tau$, no more than $t_3=\max\{t_2\}=t_0+\delta+2\Gamma$. The W-ACK-DATA state ends at $t_4=t_0+\delta+\Delta_2$.

Given $\Delta_2>2\Gamma$ (Eq. 3), the following inequality exists:

$$t_3 < t_4 \quad \text{(Eq. 7)}$$

Namely, $R_1$'s busy tone disappears at $S_1$ before the end of the W-ACK-DATA state if an error occurs during $R_1$'s receiving process.

It has already been illustrated by Theorem 1 that all competing busy tone signals at the ACK-AH state disappear after $t_0+\delta_{AH}+2\Gamma$. During the W-ACK-DATA state, $S_1$ continues to send data (e.g., dummy data) that prevents other nodes in $S_1$'s coverage area from switching on a busy tone.

Accordingly, there is no busy tone in $S_1$'s coverage area at the end of the W-ACK-DATA state. This is contradictory to the proposition that $S_1$ does sense a busy tone at $t_4$. Therefore, a sender at the end of W-ACK-DATA state that detects a busy tone has transmitted the data packet without error in AWCD/ACK.

Corollary 1: During a successful data transmission period, exposed nodes cannot be trapped in a receiving situation by mistake and hidden nodes cannot transmit competing data packets.

Proof of Corollary 1: A successful data transmission period between a sender $S_1$ and a receiver $R_1$ includes states ACK-AH, S-DATA, W-ACK-DATA, and S-ACK (FIG. 6). FIG. 7a shows an undesired situation where the exposed node E is trapped in a receiving situation while $S_1$ is sending data to $R_1$. In this case, $S_1$ would have sensed the busy tone from more than one receiver after the ACK-AH state, which is contradictory to Theorem 1.

FIG. 7b shows another undesired situation where the hidden node H is trapped in a transmitting situation during the entire transmission period between $S_1$ and $R_1$. This is contradictory to Lemma 1 and Theorem 2. Accordingly, AWCD/ACK prevents hidden-node transmitting, and exposed-node receiving.

Corollary 2: Exposed nodes are allowed to transmit. Hidden nodes are allowed to receive.

Figure 7C:
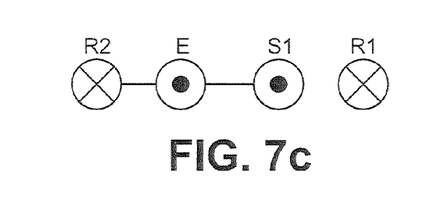
Figure 7D:
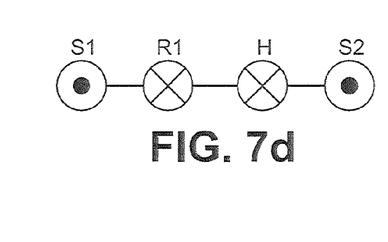

Proof of Corollary 2: The two situations of Corollary 2 are illustrated in FIGS. 7c and 7d. As shown in FIG. 7c, exposed node E does not detect the-busy tone from $R_1$ and is free to transmit data to a receiver that is out of $S_1$'s coverage area. As shown in FIG. 7d, hidden node H is not affected by $S_1$'s transmission and is free to receive data from a sender that is out of $R_1$'s coverage area. Accordingly, AWCD/ACK allows concurrent transmissions in ad hoc networks.

Although only a few exemplary embodiments of this disclosure have been described in details above, those skilled in the art will readily appreciate that many modifications are possible in the exemplary embodiments without materially departing from the novel teachings and advantages of this disclosure. For example, while the term "packet" is used for purposes of example, it is understood that the present disclosure applies to any type of transmission using a defined transmission unit, including packets, datagrams, and frames, and that the term "packet" represents any such unit. Also, features illustrated and discussed above with respect to some embodiments can be combined with features illustrated and discussed above with respect to other embodiments. Accordingly, all such modifications are intended to be included within the scope of this disclosure.

What is claimed is:

1. A method for use by a receiving node in an ad hoc network, the method comprising:
   emitting a tone after determining that a transmission is incoming from a sending node, wherein the tone is an unmodulated wave out of the data channel;
   receiving an initial portion of a packet comprising the transmission while emitting the tone, wherein the initial portion contains a destination address of the packet;
   stopping the emitting of the tone if the received destination address does not match an address of the receiving node, wherein the stopping of the tone returns the receiving node to an idle state; and
   receiving a remaining portion of the packet while continuing to emit the tone if the received destination address matches the address of the receiving node, wherein the tone is used to acknowledge the successful receipt of the remaining portion of the packet.

2. The method of claim 1 further comprising continuing to emit the tone for at least a first period of time after receiving the remaining portion.

3. The method of claim 2 wherein the first period of time is defined as having a duration at least equal to a maximum two-way propagation delay of a coverage area of the receiving node.

4. The method of claim 1 further comprising stopping the emitting of the tone if an error occurs while receiving the remaining portion.

5. The method of claim 1 further comprising stopping the emitting of the tone directly after the remaining portion is received by the receiving node.

6. The method of claim 1 wherein the tone is a busy tone.

7. A method for use in an ad hoc network comprising:
   starting, by a first node, a first timer;
   initiating, by the first node, a transmission to a second node;
   emitting, by the second node, a tone in response to detecting the initiating of the Transmission, wherein the tone is an unmodulated wave out of the data channel;
   determining, by the second node, whether the transmission is intended for the second node based on a first portion of a packet comprising the transmission received by the second node;
   continuing to emit the tone if the packet is intended for the second node;
   sending, by the first node, a second portion of the packet if the tone is still being emitted by the first node after the expiration of the first timer; and
   stopping, by the second node, the emitting of the tone after receiving the second portion of the packet, wherein the tone is further configured to acknowledge the successful receipt of the remaining portion of the packet.

8. The method of claim 7 wherein the stopping the tone after receiving the second portion occurs only after a second timer has elapsed, wherein the timer is started by the second node after the second portion of the packet is received.

9. The method of claim 8 wherein the second timer has a duration equal to at least a maximum two-way propagation delay of a coverage area of the second node.

10. The method of claim 8 further comprising:
    starting, by the first node, a third timer after sending the second portion; and
    determining whether the tone remains on until the expiration of the third timer.

11. The method of claim 10 further comprising sending dummy data, by the first node to the second node, between the start and expiration of the third timer.

12. The method of claim 10 further comprising:
    buffering the packet if the tone does not remain on between the start and expiration of the third timer; and
    attempting to resend the packet at a later time.

13. The method of claim 7 further comprising immediately stopping the emitting of the tone by the second node if an error occurs while receiving the second portion.

14. The method of claim 7 further comprising determining, by the first node, whether a tone is being emitted prior to initiating the transmission, wherein the transmission is not initiated if a tone is being emitted.

15. A receiving node for use within an ad hoc network comprising:

a wireless communication system;

a processor coupled to the wireless communication system; and a memory containing a plurality of instructions for execution by the processor, the instructions including instructions for:

receiving a plurality of bits from a sending node, wherein the plurality of bits comprise a portion of an address header for a data packet;

turning on a tone after receiving the plurality of bits and before identifying the address header, wherein the tone is an unmodulated wave out of the data channel;

comparing the address header with an address of the receiving node and continuing to emit the tone if the address header matches the address of the receiving node; and turning off the tone after receiving a remaining portion of the data packet, wherein the tone is further configured to acknowledge the successful receipt of the remaining portion of the packet.

16. The receiving node of claim 15 further comprising instructions for turning off the tone if the address header does not match the address of the receiving node.

17. The receiving node of claim 15 further comprising instructions for turning off the tone after receiving a remaining portion of the data packet only after a time period has elapsed, wherein the time period is started upon receiving the remaining portion.

18. The receiving node of claim 17 wherein the time period has a duration greater than a maximum two-way propagation delay of a coverage area of the receiving node.

19. A sending node for use within an ad hoc network comprising:

a wireless communication system;

a processor coupled to the wireless communication system; and a memory containing a plurality of instructions for execution by the processor, the instructions including instructions for:

setting a timer of a first time period and initiating a transmission of a data packet to a receiving node if a tone is not detected, wherein the tone is an unmodulated wave out of the data channel;

determining if a tone is detected prior to the expiration of the timer; and continuing the transmission of the data packet if a tone is detected, wherein the entire transmission is substantially uninterrupted if a tone is detected, wherein the tone is further configured to acknowledge the successful receipt of the remaining portion of the packet.

20. The sending node of claim 19 further comprising instructions for:

starting a timer of a second time period after the data packet is sent; and determining whether the tone is emitted during the entire second time period.

21. The sending node of claim 20 further comprising instructions for sending dummy data to the receiving node during the second time period.

22. The sending node of claim 19 wherein the first time period is greater than a maximum two-way propagation delay of a coverage area of the sending node.

* * * * *